United States Patent
Ochs et al.

(10) Patent No.: US 10,677,619 B2
(45) Date of Patent: Jun. 9, 2020

(54) METHOD OF MONITORING A VECTOR-BASED POSITION SENSOR

(71) Applicant: GM GLOBAL TECHNOLOGY OPERATIONS LLC, Detroit, MI (US)

(72) Inventors: David S. Ochs, Troy, MI (US); Rachel Hoener, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 15/641,931

(22) Filed: Jul. 5, 2017

(65) Prior Publication Data

US 2019/0011296 A1    Jan. 10, 2019

(51) Int. Cl.
  *G01D 18/00* (2006.01)
  *G01D 5/243* (2006.01)

(52) U.S. Cl.
  CPC ........... *G01D 18/00* (2013.01); *G01D 5/243* (2013.01)

(58) Field of Classification Search
  None
  See application file for complete search history.

(56) References Cited

U.S. PATENT DOCUMENTS

| | | | | |
|---|---|---|---|---|
| 5,686,804 A | * | 11/1997 | Siraky | G01D 5/2455 318/592 |
| 2001/0006049 A1 | * | 7/2001 | Buehrle, II | F01L 9/02 123/90.12 |
| 2003/0094044 A1 | * | 5/2003 | Kruger | G01F 23/38 73/313 |
| 2014/0375241 A1 | * | 12/2014 | Yamamoto | G01D 5/2046 318/490 |
| 2016/0161289 A1 | * | 6/2016 | Fujita | G01D 5/145 324/207.21 |
| 2016/0223363 A1 | * | 8/2016 | Fujita | G01D 5/24461 |

FOREIGN PATENT DOCUMENTS

CN    102564295 A    7/2012
JP    2005049097 A    2/2005

* cited by examiner

*Primary Examiner* — Tung S Lau
(74) *Attorney, Agent, or Firm* — Quinn IP Law (57) ABSTRACT

A method of monitoring a position sensor includes calculating an absolute value of a sine signal and an absolute value of a cosine signal from the position sensor. At least one of the absolute value of the sine signal and the absolute value of the cosine signal is compared to a minimum threshold to determine if the at least one of the absolute value of the sine signal and the absolute value of the cosine signal is less than the minimum threshold, or if the at least one of the absolute value of the sine signal and the absolute value of the cosine signal is equal to or greater than the minimum threshold. A fault with the position sensor is indicated when the at least one of the absolute value of the sine signal and the absolute value of the cosine signal is less than the minimum threshold.

19 Claims, 2 Drawing Sheets

METHOD OF MONITORING A VECTOR-BASED POSITION SENSOR

INTRODUCTION

The disclosure generally relates to a method of monitoring a vector-based position sensor.

Rotational position of a rotating shaft, such as but not limited to a shaft of an electric motor, is an essential input used by control systems. Many rotational sensors produce an output having a sine signal in the form of $S=A \sin(\theta)$, and a cosine signal in the form of $C=A \cos(\theta)$, wherein A is a scaling factor and $\theta$ is the angle sensed by the rotational sensor. The control systems may use the sine signal and the cosine signal to calculate the rotational position of the rotating shaft.

If the position sensor is outputting a faulty signal, either the sine signal or the cosine signal, the calculated position of the rotating shaft will be incorrect, and the control system may not operate properly. It is therefore important to monitor the operation of the position sensor to in order to detect a faulty signal from the position sensor.

SUMMARY

A method of monitoring a vector-based position sensor is provided. The method includes sensing a position of the rotating shaft with the position sensor. The sensed position of the rotating shaft includes sine signal and a cosine signal. The sine signal includes a sine function of a sensed angle of the rotating shaft. The cosine signal includes a cosine function of the sensed angle of the rotating shaft. An absolute value of the sine signal and an absolute value of the cosine signal are calculated with a diagnostic controller. The diagnostic controller compares at least one of the absolute value of the sine signal and the absolute value of the cosine signal to a minimum threshold. The absolute value of the sine signal or the cosine signal is compared to the minimum threshold to determine if the absolute value of the sine signal and the absolute value of the cosine signal are less than the minimum threshold, or if the at least one of the absolute value of the sine signal and the absolute value of the cosine signal are equal to or greater than the minimum threshold. A diagnostic controller indicates a fault with the position sensor when the at least one of the absolute value of the sine signal and the absolute value of the cosine signal is less than the minimum threshold.

In one embodiment of the method, the diagnostic controller compares the absolute value of the sine signal to the absolute value of the cosine signal to identify which one of the absolute value of the sine signal and the absolute value of the cosine signal has a larger value. The one of the absolute value of the sine signal and the absolute value of the cosine signal having the larger value is defined as a largest signal value. The step of comparing the at least one of the absolute value of the sine signal and the absolute value of the cosine signal to the threshold includes comparing the largest signal value to the threshold.

In one embodiment of the method, the diagnostic controller compares the largest signal value to a maximum threshold to determine if the largest signal value is equal to or less than the maximum threshold, or if the largest signal value is greater than the maximum threshold. The diagnostic controller may indicate a fault with the position sensor when the largest signal value is greater than the maximum threshold.

The method of monitoring the position sensor is an iterative process that is continuously repeated over a sample time period. Accordingly, one aspect of the method of monitoring the position sensor includes continuously sensing the sine signal and the cosine signal over the sample time period.

One aspect of the method of monitoring the position sensor includes calculating a minimum fail time period as a function of a rotational speed of the shaft.

Another aspect of the method of monitoring the position sensor includes the diagnostic controller incrementing a fail timer when the largest signal value is less than the minimum threshold. The diagnostic controller indicates the fault with the position sensor when the fail timer increments to a fail time limit. The fail time limit is less than the minimum fail time period, which is a function of a rotational speed of the rotating shaft.

In one embodiment of the method of monitoring the position sensor, the diagnostic controller extracts a value of the sensed angle from the sensed sine signal and the sensed cosine signal. The diagnostic controller then calculates a sine function of the extracted value of the sensed angle to define a sine of the extracted value, and calculates a cosine function of the extracted value of the sensed angle to define a cosine of the extracted value.

In one embodiment, the diagnostic controller scales the sine of the extracted value to define a scaled sine of the extracted value, and scales the cosine of the extracted value to define a scaled cosine of the extracted value. The diagnostic controller then calculates an absolute value of the scaled sine of the extracted value, and an absolute value of the scaled cosine of the extracted value.

In one embodiment of the method, the diagnostic controller calculates a difference between the absolute value of the sine signal and the absolute value of the scaled sine of the extracted value to define a sine value difference. The diagnostic controller further calculates a difference between the absolute value of the cosine signal and the absolute value of the scaled cosine of the extracted value to define a cosine value difference.

In one embodiment of the method of monitoring the position sensor, the minimum threshold is defined to equal a value of substantially equal to zero. The step of comparing the at least one of the absolute value of the sine signal and the absolute value of the cosine signal to the minimum threshold includes comparing a sine value difference to the minimum threshold to determine if the sine value difference is less than the minimum threshold, or if the sine value difference is equal to or greater than the minimum threshold. The step of comparing the at least one of the absolute value of the sine signal and the absolute value of the cosine signal to the minimum threshold includes comparing the cosine value difference to the minimum threshold to determine if the cosine value difference is less than the minimum threshold, or if the cosine value difference is equal to or greater than minimum threshold. The diagnostic controller may also compare the sine value difference and the cosine value difference to a maximum threshold to determine if the sine value difference and the cosine value difference are greater than the maximum threshold respectively, or if the sine value difference and the cosine value difference are not greater than the maximum threshold respectively. The diagnostic controller may indicate a fault when either the sine value difference and/or the cosine value difference is less than the minimum threshold, or when the sine value difference and/or the cosine value difference is greater than the maximum threshold.

In one embodiment of the method of monitoring the position sensor, the minimum fail time period is calculated from the equation:

$$t_{f,min} \approx 2\arcsin\left(\frac{K_{low}}{A_1}\right)\left(\frac{30}{(\pi)(n)(RPP)}\right)(flr)\left(\frac{(n)(RPP)(t_s)}{30}\right);$$

wherein $t_{f,min}$ is the minimum fail time period, $K_{low}$ is a minimum expected signal amplitude modified by a scale factor, $A_1$ is the amplitude of the non-faulted signal, n is the rotational speed of the shaft in revolutions per minute, RPP is a sensor scale factor, flr is a floor function that rounds down to the nearest integer, and $t_s$ is the sample time period.

In another embodiment of the method of monitoring the position sensor, the minimum fail time period is calculated from the equation:

$$t_{f,min} = (T_f)(flr)\left(\frac{t_s}{T_{cyc}}\right) + \left(flr\left(\frac{t_s - (T_{cyc})(floor)\left(\frac{t_s}{T_{cyc}}\right)}{Tcyc - Tf}\right)\right)\left((t_s) - (T_{cyc})(flr)\left(\frac{t_s}{T_{cyc}}\right) - (T_{cyc} - T_f)\right),$$

wherein $t_{f,min}$ is the minimum fail time period, $t_s$ is the sample time period, and flr is a floor function that rounds down to the nearest integer. $T_f$ is calculated from the equation:

$$T_f = \left(\frac{T_{cyc}}{\pi}\right)\arccos\left(\frac{A_1^2 + A_2^2 - 2K_{low}}{A_1^2 - A_2^2}\right),$$

wherein $K_{low}$ is the square of the minimum expected signal amplitude, $A_1$ is the amplitude of the sine signal, and $A_2$ is the amplitude of the cosine signal. $T_{cyc}$ is calculated from the equation:

$$Tcyc = \left(\frac{30}{(n)(RPP)}\right),$$

wherein n is the rotational speed of the shaft in revolutions per minute, and RPP is a sensor scale factor.

Accordingly, the method of monitoring the position sensor provides a new process for identifying a fault with one or both of the sine signal or the cosine signal from the position sensor. The method described herein provides an efficient process that produces a quick fault detection time, while being computationally efficient, requiring little computational capacity from the diagnostic controller. As such, the method described herein is a new process that improves the operation of the diagnostic controller.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a method of monitoring a position sensor is generally shown. The method described herein may be used to monitor the performance of a rotational position sensor. The position sensor may include any type of sensor that outputs a sine signal and a cosine signal for a sensed angle θ of a rotating shaft. The sine signal is a sine function of a sensed angle of the rotating shaft, and may generally be described by the equation S=A sin(θ), wherein S is the sine signal, A is a scaling factor, and θ is the angle sensed by the rotational sensor. The cosine signal is a cosine function of the sensed angle of the rotating shaft, and may generally be described by the equation C=A cos(θ), wherein C is the cosine signal, A is a scaling factor, and θ is the angle sensed by the rotational sensor.

The process described herein may be embodied as a sensor diagnostic algorithm operable on a diagnostic controller. The diagnostic controller may include a computer and/or processor, and include all software, hardware, memory, algorithms, connections, sensors, etc., necessary to manage and control the operation of the position sensor. The diagnostic controller may be an independent device, or may be incorporated into another machine, such as another controller or computer. The diagnostic controller may alternatively be referred to as a control module, a controller, a control unit, a computer, etc. It should be appreciated that the diagnostic controller may include any device capable of analyzing data from various sensors, comparing data, performing calculations, making the necessary decisions required to evaluate the operation of the position sensor, and executing the required tasks necessary to monitor the operation of the position sensor.

The diagnostic controller may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The diagnostic controller includes tangible, non-transitory memory on which are recorded computer-executable instructions, including the sensor diagnostic algorithm. The processor of the diagnostic controller is configured for executing the sensor diagnostic algorithm. The sensor diagnostic algorithm implements the method monitoring the position sensor.

The method of monitoring the position sensor is an iterative process, the steps of which are executed multiple times within a sample time period. One iteration of the process is described in detail herein. The iterative process is repeated, and the results of each iteration are used to monitor the performance of the position sensor, as described in greater detail below.

In general, the method of monitoring the position sensor includes sensing an angular position of the rotating shaft with the position sensor. The sensed angular position of the rotating shaft includes the sine signal and the cosine signal. An absolute value for each of the sine signal and the cosine signal is calculated, and at least one of the absolute value of the sine signal and the absolute value of the cosine signal is compared to a minimum threshold. The position sensor may be faulty if the one of the absolute value of the sine signal and the absolute value of the cosine signal that is compared to the minimum threshold is less than the minimum threshold. However, due to the nature of sine and cosine values, as one of the sine signal and the cosine signal approaches zero, the other of the sine signal and the cosine signal approaches one. This natural fluctuation between the sine signal and the cosine signal makes it difficult to diagnose the position sensor from a single sensed angle of the rotating shaft. Accordingly, the process is an iterative process, in which the steps of the process are repeatedly executed to ensure that a faulty sine signal or a faulty cosine signal is detected as the sine value and the cosine value fluctuate between zero and one for the different detected angles $\theta$.

Figure 1:
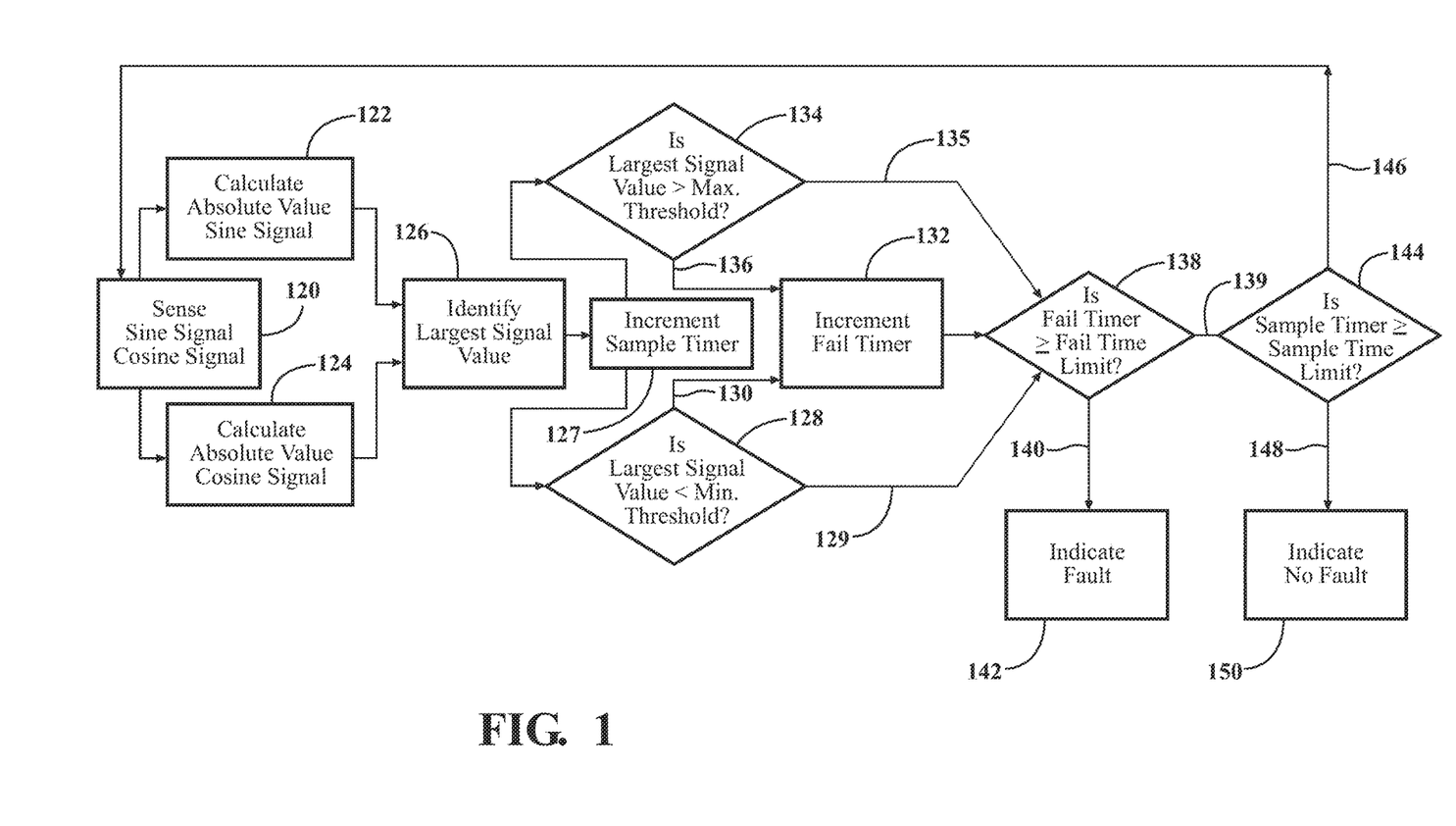
FIG. 1 is a flowchart representing a first embodiment of a method of monitoring a vector-based position sensor.

Referring to FIG. 1, a first embodiment of the method of monitoring the position sensor is described in detail. The first embodiment of the method includes sensing a position of the rotating shaft with the position sensor. The sensed position of the rotating shaft includes the sine signal and the cosine signal for a specific measured angle $\theta$ of the rotating shaft. As noted above, the sine signal includes a sine function of the sensed angle $\theta$ of the rotating shaft, and the cosine signal includes a cosine function of the sensed angle $\theta$ of the rotating shaft. The step of sensing the sine signal and the cosine signal, i.e., sensing the position of the rotating shaft, is generally indicated by box 120 in FIG. 1.

An absolute value of the sine signal and an absolute value of the cosine signal are calculated. The step of calculating the absolute value of the sine signal is generally indicated by box 122 in FIG. 1. The step of calculating the absolute value of the cosine signal is generally indicated by box 124 in FIG. 1. As used herein, the term "absolute value" may be interpreted as the magnitude of a real number without regard to its sign, or as the actual magnitude of a numerical value or measurement, irrespective of its relation to other values.

The absolute value of the sine signal is then compared to the absolute value of the cosine signal to identify which one of the absolute value of the sine signal and the absolute value of the cosine signal has a larger value or magnitude. The step of identifying which one of the absolute value of the sine signal and the absolute value of the cosine signal has the largest value is generally indicated by box 126 in FIG. 1. The respective one of the absolute value of the sine signal and the absolute value of the cosine signal having the larger value is defined as a largest signal value. For example, if the sine signal has an absolute value of 0.50 and the cosine signal has an absolute value 0.86, then the cosine signal has the largest value, and the largest signal value is defined to equal the absolute value of the cosine signal, i.e., 0.86.

A sample timer is incremented to track an accumulated amount of time over which the position sensor is monitored. The step of incrementing the sample timer is generally indicted by box 127 in FIG. 1. The sample timer may include, but is not limited to, a time tracking device of the diagnostic controller. The sample timer is incremented for each iteration of the process by the amount of time that the position sensor is being sampled.

As described generally above, at least one of the absolute value of the sine signal and the absolute value of the cosine signal is compared to the minimum threshold. The first embodiment of the method of monitoring the position sensor defines the comparison of one of the absolute value of the sine signal and the absolute value of the cosine signal to the minimum threshold as comparing the largest signal value to the minimum threshold. The step of comparing the largest signal value to the minimum threshold is generally indicated by box 128 in FIG. 1. Accordingly, the specific one of the absolute value of the sine signal and the absolute value of the cosine signal that is compared to the minimum threshold, for the first embodiment of the method described herein, is the respective one of the absolute value of the sine signal and the absolute value of the cosine signal that has the largest value, which was previously defined as the largest signal value. The largest signal value is compared to the minimum threshold to determine if the largest signal value is less than the minimum threshold, or if the largest signal value is equal to or greater than the minimum threshold. The minimum threshold is a pre-defined value that is indicative of a lower bound for a proper signal from the position sensor, or a minimum expected value given the specific sensor, signal conditioning circuitry, etc.

The position sensor may be faulty when the largest signal value is less than the minimum threshold, generally indicated at 130. If the position sensor is faulty, the largest signal value will be less than the minimum threshold for a period of time within the sample time period. Accordingly, a fail timer is incremented continuously while at least one of the absolute value of the sine signal and the absolute value of the cosine signal, i.e., largest signal value, is less than the minimum threshold within the sample time period. The step of incrementing the fail timer is generally indicated by box 132 in FIG. 1. The fail timer tracks an accumulated amount of time that the largest signal value is less than the minimum threshold. The fail timer is a measurement of the amount of time that the position sensor is generating a signal that is indicative of a fault.

If the largest signal value is not less than the minimum threshold, i.e., if the largest signal value is equal to or greater than the minimum threshold, generally indicated at 129, then the diagnostic controller compares the fail timer to a fail time limit to determine if the fail timer is less than the fail time limit, or if the fail timer is equal to or greater than the fail time limit. The step of comparing the fail timer to the fail time limit is generally indicated by box 138 in FIG. 1, and is described in greater detail below.

Additionally, the largest signal value may be compared to a maximum threshold to determine if the largest signal value is equal to or less than the maximum threshold, or if the largest signal value is greater than the maximum threshold.

The step of comparing the largest signal value of the maximum threshold is generally indicated by box 134 in FIG. 1. The maximum threshold is a pre-defined value that is indicative of an upper bound for proper signal from the position sensor, or a maximum expected value given the specific sensor, signal conditioning circuitry, etc.

The position sensor may be faulty when the largest signal value is greater than the maximum threshold, generally indicated at 136. If the position sensor is faulty, the largest signal value will be greater than the maximum threshold for a period of time within the sample time period. Accordingly, the fail timer may be incremented continuously while at least one of the absolute value of the sine signal and the absolute value of the cosine signal, i.e., largest signal value, is greater than the maximum threshold within the sample time period. The step of incrementing the fail timer is generally indicated by box 132 in FIG. 1. The fail timer tracks an accumulated amount of time that the largest signal value is greater than the maximum threshold. It should be appreciated that the diagnostic controller may include separate fail timers to track the largest signal value relative to the maximum threshold and the minimum threshold respectively.

If the largest signal value is not greater than the maximum threshold, i.e., if the largest signal value is equal to or less than the maximum threshold, generally indicated at 135, then the diagnostic controller compares the fail timer to the fail time limit to determine if the fail timer is less than the fail time limit, or if the fail timer is equal to or greater than the fail time limit. The step of comparing the fail timer to the fail time limit is generally indicated by box 138 in FIG. 1, and is described in greater detail below.

As noted above, the process described herein is an iterative process, in which each of the steps described above for the first embodiment of the method of monitoring the position sensor are repeatedly executed. The diagnostic controller indicates a fault with the position sensor when the fail timer is greater than the fail time limit, i.e., when a value of the fail timer has incremented to a pre-defined value, i.e., the fail time limit, in less than a sample time limit.

The fail time limit may be defined according to a minimum fail time calculation for a given set of conditions that have been previously determined to constitute a fault. Accordingly, the fail timer is compared to the fail time limit to determine if the fail timer is less than the fail time limit, or if the fail timer is equal to or greater than the fail time limit. The step of comparing the fail timer to the fail time limit is generally indicated by box 138 in FIG. 1. If the fail timer has incremented to a value that is equal to or greater than the fail time limit, in less than the sample time limit, generally indicated at 140, then the indication of a fault with the position sensor is made. The step if indicating a fault with the position sensor is generally indicated by box 142 in FIG. 1. The fault with the position sensor may be indicated in any suitable manner, including but not limited to, setting a diagnostic code in the diagnostic controller, illuminating a warning lamp, displaying a message, etc.

If the fail timer is less than the fail time limit, generally indicated at 139, then the sample timer is compared to the sample time limit to determine if the sample timer is equal to or greater than the sample time limit, or if the sample timer is less than the sample time limit. The step of comparing the sample timer to the sample time limit is generally indicated by box 144 in FIG. 1. The sample time limit may be defined to include any period of time sufficient to detect a fault with the position sensor. It should be appreciated that the longer the sample time limit is, the more likely a fault indication will be obtained, whereas the shorter the sample time limit is, the less likely a fault indication will be obtained. The sample time limit should be defined to include a time period that is at least greater than a minimum fail time period, described in greater detail below. If the sample timer is less than the sample time limit, generally indicated at 146, then no further action is taken, and the process is repeated. If the sample timer is equal to or greater than the sample time limit, generally indicated at 148, and the fail timer has not incremented to a value that is equal to or greater than the fail time limit, then the diagnostic controller indicates no fault with the position sensor. The step of indicating no fault with the position sensor is generally indicated by box 150 in FIG. 1.

As noted above, the process is repeatedly executed over the sample time period, to determine if the fail counter increments to the fail time limit within the sample time limit. In other words, if the sample time period is less than the sample time limit, then there is an insufficient time period to completely diagnose the position sensor, and the process is repeated until the sample time period, as measured by the sample timer, is equal to or greater than the sample time limit.

The fail time limit may be defined based on a minimum fail time period. The minimum fail time period is a minimum amount of time that the fault will be detectable during one sample time period for a given set of conditions. The minimum fail time period is the minimum guaranteed fail time that will be captured during a given sample time period, i.e., the guaranteed time during which the diagnosed signal(s) is (are) below (above) the minimum (maximum) signal threshold. The minimum fail time period provides a ceiling for setting the fail time limit at which a fault is indicated. The fail time limit must be set to a value or period of time that is equal to or less than the minimum fail time period to ensure that a fault in the position sensor is detected. Accordingly, in order for a fault to be detected, the fail timer must be equal to or greater than the fail time limit, and the fail time limit must be less than the minimum fail time period.

The minimum fail time period may be defined as a function of a rotational speed of the rotating shaft. For example, for the first embodiment of the method of monitoring the position sensor, the minimum fail time period may be calculated from Equation 1 below.

$$t_{f,min} \approx 2\arcsin\left(\frac{K_{low}}{A_1}\right)\left(\frac{30}{(\pi)(n)(RPP)}\right)(flr)\left(\frac{(n)(RPP)(t_s)}{30}\right) \quad 1)$$

Within Equation 1, $t_{f,min}$ is the minimum fail time period, $K_{low}$ is a minimum expected signal amplitude modified by a scale factor, $A_1$ is the amplitude of the non-faulted signal, n is the rotational speed of the shaft in revolutions per minute, RPP is a sensor scale factor, flr is a floor function that rounds down to the nearest integer, and $t_s$ is the sample time period. The calculation of the minimum fail time period for the first embodiment of the method of monitoring the position sensor is an approximation, because Equation 1 only considers full sample windows and not partial sample windows. Additionally, the calculation of the minimum fail time period with Equation 1 above is dependent upon a sampling rate of the diagnostic controller. Equation 1 reflects a calculation of the minimum fail time period based on an infinite sampling rate, i.e., continuous sampling. Slower sampling rates may affect the calculated minimum fail time period.

Figure 2:
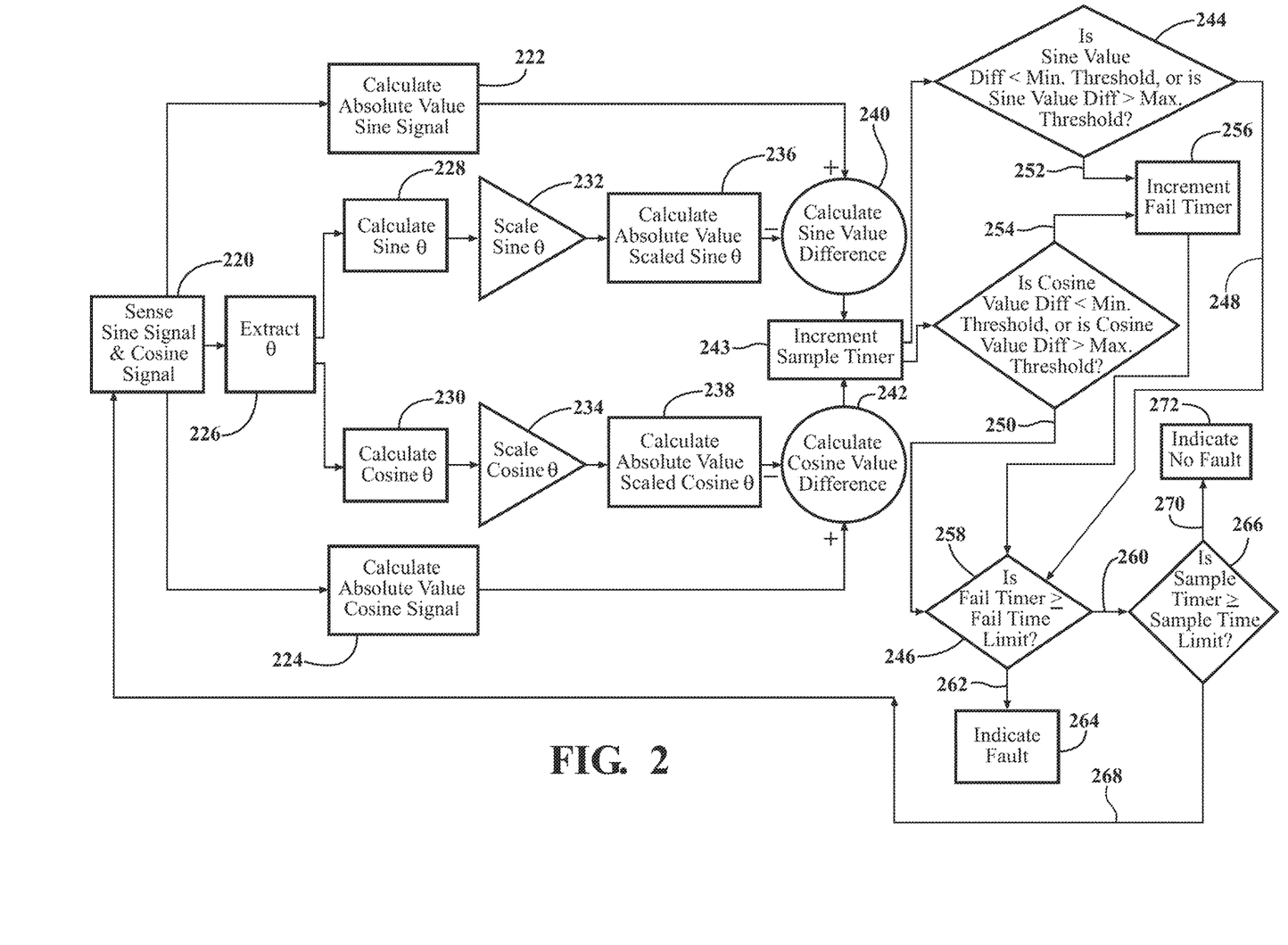
FIG. 2 is a flowchart representing a second embodiment of the method of monitoring the vector based position sensor.

Referring to FIG. 2, a second embodiment of the method is described in detail. The second embodiment of the method of monitoring the position sensor includes sensing the position of the rotating shaft with the position sensor. The sensed position of the rotating shaft include the sine signal and the cosine signal for a specific measured angle θ of the rotating shaft. The step of sensing the sine signal and the cosine signal, i.e., sensing the position of the rotating shaft, is generally indicated by box 220 in FIG. 2. As noted above, the sine signal includes a sine function of the sensed angle θ of the rotating shaft, and the cosine signal includes a cosine function of the sensed angle θ of the rotating shaft.

An absolute value of the sine signal and an absolute value of the cosine signal are calculated. The step of calculating the absolute value of the sine signal is generally indicated by box 222 in FIG. 2. The step of calculating the absolute value of the cosine signal is generally indicated by box 224 in FIG. 2. As used herein, the term "absolute value" may be interpreted as the magnitude of a real number without regard to its sign, or as the actual magnitude of a numerical value or measurement, irrespective of its relation to other values.

A value of the sensed angle θ is extracted from the sensed sine signal and the sensed cosine signal. The step of extracting the sensed angle θ is generally indicated by box 226 in FIG. 2. The diagnostic controller may extract the sensed angle θ in any suitable manner. For example, the sine signal may be divided by the cosine signal to define a signal quotient, and the arctan of the signal quotient may be calculated to derive the sensed angle θ. Alternatively, a tracking loop may be used to extract the sensed angle θ from the sine signal and the cosine signal. It should be appreciated that the sensed angle θ may be extracted in some other manner not shown or described herein.

Once the sensed angle θ has been extracted from the sine signal and the cosine signal, then the diagnostic controller calculates the sine function of the extracted value of the sensed angle θ, to define a sine of the extracted value. The step of calculating the sine function of the extracted value of the sensed angle θ is generally indicated by box 228 in FIG. 2. Additionally, the diagnostic controller calculates the cosine function of the extracted value of the sensed angle θ, to define a cosine of the extracted value. The step of calculating the cosine function of the extracted value of the sensed angle θ is generally indicated by box 230 in FIG. 2.

The sine of the extracted value may be scaled to define a scaled sine of the extracted value. The step of scaling the sine of the extracted value is generally indicated by box 232 in FIG. 2. Similarly, the cosine of the extracted value may be scaled to define a scaled cosine of the extracted value. The step of scaling the cosine of the extracted value is generally indicated by box 234 in FIG. 2. The sine of the extracted value and the cosine of the extracted value may be scaled by multiplying the sine of the extracted value and the cosine of the extracted value by a multiplier. The multiplier is the smallest expected amplitude of the sensor outputs.

An absolute value of the scaled sine of the extracted value is then calculated. The step of calculating the absolute value of the scaled sine of the extracted value is generally indicated by box 236 in FIG. 2. Similarly, an absolute value of the scaled cosine of the extracted value is also calculated. The step of calculating the absolute value of the scaled cosine of the extracted value is generally indicated by box 238 in FIG. 2. As noted above, the term "absolute value" may be interpreted as the magnitude of a real number without regard to its sign, or as the actual magnitude of a numerical value or measurement, irrespective of its relation to other values.

A difference between the absolute value of the sine signal and the absolute value of the scaled sine of the extracted value is then calculated, and the difference is defined as a sine value difference. The step of calculating the sine value difference is generally indicated by box 240 in FIG. 2. A difference between the absolute value of the cosine signal and the absolute value of the scaled cosine of the extracted value is also calculated, and the difference is defined as a cosine value difference. The step of calculating the cosine value difference is generally indicated by box 242 in FIG. 2.

A sample timer is incremented to track an accumulated amount of time over which the position sensor is monitored. The step of incrementing the sample timer is generally indicted by box 243 in FIG. 2. The sample timer may include, but is not limited to, a time tracking device of the diagnostic controller. The sample timer is incremented for each iteration of the process by the amount of time that the position sensor is being sampled.

As noted above, at least one of the absolute value of the sine signal and the absolute value of the cosine signal is compared to the minimum threshold. For the second embodiment of the method of monitoring the position sensor, the minimum threshold is defined to equal a value substantially equal to zero, or slightly less than zero. Furthermore, comparing at least one of the absolute value of the sine signal and the absolute value of the cosine signal, in the context of the second embodiment of the method of monitoring the position sensor, is defined as comparing the sine value difference to the minimum threshold, i.e., zero, in order to determine if the sine value difference is less than the minimum threshold, or equal to or greater than the minimum threshold, and comparing the cosine value difference to the minimum threshold, i.e., zero, in order to determine if the cosine value difference is less than the minimum threshold, or equal to or greater than the minimum threshold. Additionally, the sine value difference and the cosine value difference may each be compared to a maximum threshold. The maximum threshold is a pre-defined value that is indicative of an upper bound for proper signal from the position sensor, or a maximum expected value given the specific sensor, signal conditioning circuitry, etc. The step of comparing the sine value difference to the minimum threshold and the maximum threshold is generally indicated by box 244 in FIG. 2. The step of comparing the cosine value difference to the minimum threshold and the maximum threshold is generally indicated by box 246 in FIG. 2.

The position sensor may be faulty when the sine value difference is less than the minimum threshold, e.g., less than zero, or when the sine value difference is greater than the maximum threshold, generally indicated at 252. Additionally, the position sensor may be faulty when the cosine value difference is less than the minimum threshold, e.g., less than zero, or greater than the maximum threshold, generally indicated at 254. A fail timer may be incremented continuously when one or both of the sine value difference and/or the cosine value difference are less than the minimum threshold within the sample time period, or when one or both of the sine value difference and/or the cosine value difference are greater than the maximum threshold within the sample time period. The step of incrementing the fail timer is generally indicated by box 256 in FIG. 2. The fail timer tracks an accumulated amount of time that the sine value difference and/or the cosine value difference are less than the minimum threshold.

If the sine value difference is not less than the minimum threshold, i.e., if the sine value difference is equal to or greater than the minimum threshold, and the sine value difference is not greater than the maximum threshold, i.e., if the sine value difference is equal or less than the maximum threshold, generally indicated at 248, then the diagnostic controller compares the value of the fail timer to the fail time limit to determine if the value of the fail timer is less than the fail time limit, or if the value of the fail timer is equal to or greater than the fail time limit. The step of comparing the value of the fail timer to the fail time limit is generally indicated by box 258 in FIG. 2, and is described in detail below. Similarly, if the cosine value difference is not less than the minimum threshold, i.e., if the cosine value difference is equal to or greater than the minimum threshold, and if the cosine value difference is not greater than the maximum threshold, i.e., if the cosine value difference is equal to or less than the maximum threshold, generally indicated at 250, then the diagnostic controller compares the value of the fail timer to the fail time limit to determine if the value of the fail timer is less than the fail time limit, or if the value of the fail timer is equal to or greater than the fail time limit. The step of comparing the value of the fail timer to the fail time limit is generally indicated by box 258 in FIG. 2, and is described in detail below.

As noted above, the process described herein is an iterative process, in which each of the steps described above for the second embodiment of the method of monitoring the position sensor are repeatedly executed. The diagnostic controller indicates a fault with the position sensor when the fail timer increments to the fail time limit in less than the sample time limit. The value of the fail timer is compared to the fail time limit to determine if the value of the fail timer is less than the fail time limit, or if the value of the fail timer is equal to or greater than the fail time limit. The step of comparing the value of the fail timer to the fail time limit is generally indicated by box 258 in FIG. 2. If the fail timer is equal to or greater than the fail time limit, generally indicated at 262, then the diagnostic controller indicates of a fault with the position sensor. The step if indicating a fault with the position sensor is generally indicated by box 264 in FIG. 2. The fault with the position sensor may be indicated in any suitable manner, including but not limited to, setting a diagnostic code in the diagnostic controller, illuminating a warning lamp, displaying a message, etc.

If the fail timer is less than the fail time limit, generally indicated at 260, then the sample timer is compared to the sample time limit to determine if the sample timer is equal to or greater than the sample time limit, or if the sample timer is less than the sample time limit. The step of comparing the sample timer to the sample time limit is general indicated by box 266 in FIG. 2. It should be appreciated that the sample timer is a measure of the accumulated sample time period. If the sample timer is less than the sample time limit, generally indicated at 268, then no further action is taken, and the process is repeated. If the sample timer is equal to or greater than the sample time limit, generally indicated at 270, and the fail timer has not incremented to a value that is equal to or greater than the fail time limit, then the diagnostic controller indicates no fault with the position sensor. The step of indicating no fault with the position sensor is generally indicated by box 272 in FIG. 2.

As noted above, the process is repeatedly executed over the sample time period, to determine if the fail counter increments to the fail time limit within the sample time limit. In other words, if the sample timer is less than the sample time limit, then there is an insufficient time period to properly diagnose the position sensor, and the process is repeated until the fail timer is equal to or greater than the fail time limit, or the sample timer is equal to or greater than the sample time limit.

The fail time period may be defined based on a minimum fail time period. The minimum fail time period is a minimum amount of time that the fault will be detectable during the sample time period for a given set of conditions. The minimum fail time period provides a ceiling for setting the fail time limit at which a fault is indicated. The fail time limit must be set to a value or period of time that is less than the minimum fail time period to ensure that a fault in the position sensor is detected. Accordingly, in order for a fault to be detected, the fail timer must be equal to or greater than the fail time limit, and the fail time limit must be less than the minimum fail time period.

The minimum fail time period may be defined as a function of a rotational speed of the rotating shaft. For example, for the second embodiment of the method of monitoring the position sensor, the minimum fail time period may be calculated from Equation 2 below.

$$t_{f,min} = (T_f)(flr)\left(\frac{t_s}{T_{cyc}}\right) + \left(flr\left(\frac{t_s - (T_{cyc})(\text{floor})\left(\frac{t_s}{T_{cyc}}\right)}{Tcyc - Tf}\right)\right)\left((t_s) - (T_{cyc})(flr)\left(\frac{t_s}{T_{cyc}}\right) - (T_{cyc} - T_f)\right) \quad 2)$$

Within Equation 2, $t_{f,min}$ is the minimum fail time period, $t_s$ is the sample time period, flr is a floor function that rounds down to the nearest integer. $T_f$ is calculated from Equation 3 below.

$$T_f = \left(\frac{T_{cyc}}{\pi}\right)\arccos\left(\frac{A_1^2 + A_2^2 - 2K_{low}}{A_1^2 - A_2^2}\right) \quad 3)$$

Within Equation 3, $K_{low}$ is the square of the minimum expected signal amplitude, $A_1$ is the amplitude of the sine signal, $A_2$ is the amplitude of the cosine signal. $T_{cyc}$ is calculated from Equation 4 below.

$$Tcyc = \left(\frac{30}{(n)(RPP)}\right) \quad 4)$$

Within Equation 3, n is the rotational speed of the shaft in revolutions per minute, and RPP is a sensor scale factor. Additionally, the calculation of the minimum fail time period with Equation 2 above is dependent upon a sampling rate of the diagnostic controller. Equation 2 reflects a calculation of the minimum fail time period based on an infinite sampling rate, i.e., continuous sampling. Slower sampling rates may affect the calculated minimum fail time period.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of monitoring a vector-based position sensor, the method comprising:

generating a sine signal including a sine function of a sensed angle of a rotating shaft, and a cosine signal including a cosine function of the sensed angle of the rotating shaft, with the position sensor;

calculating an absolute value of the sine signal, with a diagnostic controller;

calculating an absolute value of the cosine signal, with the diagnostic controller;

comparing at least one of the absolute value of the sine signal and the absolute value of the cosine signal to a first threshold, with the diagnostic controller;

indicating a fault, with the diagnostic controller, in response to the at least one of the absolute value of the sine signal and the absolute value of the cosine signal being less than the first threshold for an accumulated amount of time during a sample time period for detecting a problem with the sensed angle of the rotating shaft; and calculating the accumulated amount of time as:

$$t_{f,min} \approx 2\arcsin\left(\frac{K_{low}}{A_1}\right)\left(\frac{30}{(\pi)(n)(RPP)}\right)(flr)\left(\frac{(n)(RPP)(t_s)}{30}\right),$$

wherein $t_{f,min}$ is the accumulated amount of time, $K_{low}$ is a minimum expected signal amplitude modified by a scale factor, $A_1$ is an amplitude of a non-faulted signal, n is a rotational speed of the rotating shaft in revolutions per minute, RPP is a sensor scale factor, flr is a floor function that rounds down to a nearest integer, and $t_s$ is the sample time period.

2. The method set forth in claim 1, further comprising:
comparing the absolute value of the sine signal to the absolute value of the cosine signal; and
defining an intermediate value that matches a greater value of the absolute value of the sine signal and the absolute value of the cosine signal in response to the comparing.

3. The method set forth in claim 1, wherein:
the sine signal and the cosine signal are generated continuously over the sample time period; and
the comparing of the at least one of the absolute value of the sine signal and the absolute value of the cosine signal to the first threshold is performed a plurality of times during the sample time period.

4. The method set forth in claim 1, wherein the accumulated amount of time is calculated as a function of the rotational speed of the rotating shaft and the sample time period.

5. The method set forth in claim 1, further comprising:
extracting an angle value of the sensed angle of the rotating shaft from the sine signal and the cosine signal.

6. The method set forth in claim 2, wherein the comparing of the at least one of the absolute value of the sine signal and the absolute value of the cosine signal to the first threshold is further defined as comparing the intermediate value to the first threshold.

7. The method set forth in claim 2, wherein the indicating of the fault includes incrementing a count value of a fail timer at each one of a plurality of times during the sample period where the intermediate value is less than the first threshold.

8. The method set forth in claim 5, further comprising:
calculating a sine value based on the angle value of the sensed angle; and calculating a cosine value based on the angle value of the sensed angle.

9. The method set forth in claim 6, further comprising:
comparing the intermediate value to a second threshold, wherein the second threshold is greater than the first threshold.

10. The method set forth in claim 7, wherein:
the indicating of the fault is further defined as indicating the fault when the count value of the fail timer increments to a fail value within the sample time period; and
the fail value is a function of the rotational speed of the rotating shaft.

11. The method set forth in claim 8, further comprising:
scaling the sine value to define a scaled sine value; and
scaling the cosine value to define a scaled cosine value.

12. The method set forth in claim 9, further comprising:
indicating the fault in further response to the intermediate value being greater than the second threshold for the accumulated amount of time during the sample time period.

13. The method set forth in claim 11, further comprising:
calculating an absolute value of the scaled sine value; and
calculating an absolute value of the scaled cosine value.

14. The method set forth in claim 13, further comprising:
calculating a difference between the absolute value of the sine signal and the absolute value of the scaled sine value to define a sine value difference; and
calculating a difference between the absolute value of the cosine signal and the absolute value of the scaled cosine value to define a cosine value difference.

15. The method set forth in claim 14, wherein the comparing of the at least one of the absolute value of the sine signal and the absolute value of the cosine signal to the first threshold is further defined as:
comparing the sine value difference to the first threshold; and
comparing the cosine value difference to the first threshold.

16. The method set forth in claim 14, further comprising:
comparing the sine value difference to a second threshold; and
comparing the cosine value difference to the second threshold, wherein the second threshold is greater than the first threshold.

17. An apparatus comprising:
a position sensor configured to generate a sine signal including a sine function of a sensed angle of a rotating shaft, and a cosine signal including a cosine function of the sensed angle of the rotating shaft; and
a diagnostic controller configured to:
calculate an absolute value of the sine signal, and an absolute value of the cosine signal;
compare at least one of the absolute value of the sine signal and the absolute value of the cosine signal to a first threshold;
indicate a fault in response to the at least one of the absolute value of the sine signal and the absolute value of the cosine signal being less than the first threshold for an accumulated amount of time during a sample time period for detecting a problem with the sensed angle of the rotating shaft; and
calculate the accumulated amount of time as:

$$t_{f,min} \approx 2\arcsin\left(\frac{K_{low}}{A_1}\right)\left(\frac{30}{(\pi)(n)(RPP)}\right)(flr)\left(\frac{(n)(RPP)(t_s)}{30}\right),$$

wherein $t_{f,min}$ is the accumulated amount of time, $K_{low}$ is a minimum expected signal amplitude modified by a scale factor, $A_1$ is an amplitude of a non-faulted signal, n is a rotational speed of the rotating shaft in revolutions per minute, RPP is a sensor scale factor, flr is a floor function that rounds down to a nearest integer, and $t_s$ is the sample time period.

18. The apparatus set forth in claim 17, wherein the diagnostic controller is further configured to:
  compare the at least one of the absolute value of the sine signal and the absolute value of the cosine signal to a second threshold, wherein the second threshold is greater than the first threshold; and
  indicate the fault in further response to the at least one of the absolute value of the sine signal and the absolute value of the cosine signal being greater than the second threshold for the accumulated amount of time during the sample time period of the rotating shaft.

19. The apparatus set forth in claim 17, wherein the diagnostic controller is further configured to indicate the fault with a visual indicator.

\* \* \* \* \*